(12) United States Patent
Kelly et al.

(10) Patent No.: US 7,544,380 B2
(45) Date of Patent: Jun. 9, 2009

(54) PROCESS AND APPARATUS

(75) Inventors: Thomas Reid Kelly, Kettering (GB);
Bryan Edwin Barwick, Higham Ferrers (GB); Vijay Arjun Sawant, Raunds (GB)

(73) Assignee: FMC Corporation, Philadelphia, PA (US)

( * ) Notice: Subject to any disclaimer, the term of this patent is extended or adjusted under 35 U.S.C. 154(b) by 367 days.

(21) Appl. No.: 10/466,798

(22) PCT Filed: Jan. 16, 2002

(86) PCT No.: PCT/GB02/00180
§ 371 (c)(1),
(2), (4) Date: Jul. 16, 2003

(87) PCT Pub. No.: WO02/056713
PCT Pub. Date: Jul. 25, 2002

(65) Prior Publication Data
US 2004/0096557 A1 May 20, 2004

(30) Foreign Application Priority Data
Jan. 17, 2001 (GB) .................................. 0101244.2

(51) Int. Cl.
*A23P 1/10* (2006.01)
(52) U.S. Cl. .................... 426/575; 426/577; 426/515
(58) Field of Classification Search ................ 426/573, 426/575, 577, 389, 512, 515, 524; 264/138, 264/163; 62/1, 66, 71–72, 340, 345, 354; 425/218–220
See application file for complete search history.

(56) References Cited

U.S. PATENT DOCUMENTS

| 3,015,854 | A | | 1/1962 | McClure | |
|---|---|---|---|---|---|
| 3,503,345 | A | * | 3/1970 | Abrams | 426/100 |
| 3,798,337 | A | * | 3/1974 | Abalo | 426/279 |
| 3,900,574 | A | * | 8/1975 | Warwick | 426/274 |
| 3,922,360 | A | * | 11/1975 | Sneath | 426/573 |
| 3,940,217 | A | * | 2/1976 | McCarthy et al. | 425/98 |
| 4,334,339 | A | * | 6/1982 | Holly | 425/562 |
| 4,348,418 | A | | 9/1982 | Smith et al. | |
| 4,522,580 | A | * | 6/1985 | Poister | 425/193 |
| 4,735,817 | A | * | 4/1988 | Smith | 426/517 |
| 4,778,683 | A | * | 10/1988 | Newsteder | 426/249 |
| 4,790,242 | A | * | 12/1988 | Driessen | 99/455 |
| 4,805,524 | A | | 2/1989 | Deneuville et al. | |
| 4,998,464 | A | * | 3/1991 | Kubacki | 99/455 |

(Continued)

FOREIGN PATENT DOCUMENTS

DE 3928596 3/1991

(Continued)

*Primary Examiner*—Drew E Becker
(74) *Attorney, Agent, or Firm*—Stout, Uxa, Bryan & Mullins, LLP; Frank J. Uxa

(57) ABSTRACT

The invention relates to process and apparatus for creating shaped objects from incipiently gelling alginate or low-methoxy pectate sol in which the incipiently gelling sol is guided into cavities of a movable belt. V-shaped wiper blades can be used as guides. The sol is preferably fed onto the belt at a rate not greater than the volumetric feed rate of the cavities. The process and apparatus can be used to prepare such products as imitation fruit e.g. by incorporating pureed fruit in the incipiently gelling sol.

17 Claims, 2 Drawing Sheets

U.S. PATENT DOCUMENTS

| | | | |
|---|---|---|---|
| 5,035,907 A * | 7/1991 | Phillips et al. | 426/383 |
| 5,667,821 A * | 9/1997 | Castaneda | 425/218 |
| 5,752,432 A * | 5/1998 | Burchfield | 99/426 |
| 6,012,293 A * | 1/2000 | Andersson | 62/72 |
| 6,123,016 A * | 9/2000 | McGuire et al. | 99/483 |
| 6,153,233 A * | 11/2000 | Gordon et al. | 426/90 |
| 6,329,007 B1 * | 12/2001 | Khusro | 426/502 |
| 6,370,886 B1 * | 4/2002 | Ochs | 62/63 |
| 6,833,100 B2 * | 12/2004 | Klein | 264/219 |
| 7,033,632 B2 * | 4/2006 | Milani et al. | 426/515 |

FOREIGN PATENT DOCUMENTS

| | | |
|---|---|---|
| EP | 548814 A1 * | 6/1993 |
| GB | 1369198 | 10/1974 |
| GB | 2114417 | 8/1983 |
| GB | 2254036 | 9/1992 |
| JP | 6115669 | 1/1986 |

* cited by examiner

PROCESS AND APPARATUS

FIELD OF THE INVENTION

This invention relates to a process and apparatus for creating shaped products in which an incipiently gelling liquid is allowed to gel in moulds to form shaped products.

SUMMARY AND DETAILED DESCRIPTION OF THE INVENTION

The invention provides a process for preparing shaped products in which an incipiently gelling liquid based on alginate or low-methoxy pectate aqueous sol is fed onto a moving belt containing cavities of the required shape so as to act as moulds, the liquid is fed onto the belt and the liquid is guided into the cavities in which it is allowed to gel.

Preferably the liquid is fed onto the belt at a rate not greater than the volumetric feed rate of the cavities and particularly preferably it is fed onto the belt at the volumetric feed rate of the cavities. When the feed rate is greater than the volumetric feed rate of the cavities, there is excess liquid which then gels. If this is allowed to occur on the belt it will clog the process. So the excess would usually have to be swept off the belt. But even then it is waste or potential waste. If the flow rate is significantly lower e.g. more than 10% lower than the volumetric feed rate of the cavities then there will be unevenness in the filling of the cavities which will often lead to unacceptable products.

The invention further provides apparatus comprising a movable belt containing mould-shaped cavities and means for feeding an incipiently gelling liquid based on alginate or low-methoxy pectate aqueous sol onto the belt and means for guiding the incipiently gelling liquid into the cavities.

For the process of this invention the low-methoxy pectate should preferably contain less than 30% methoxylated hydroxyl groups. "Low-methoxy pectate" is a well-known term. Normally low-methoxy pectates are considered to be pectates (i.e. pectins) containing less than 50% methoxylated hydroxyl groups.

The incipiently gelling liquid preferably comprises food material. The food material can, for example, be fruit puree, vegetable puree or minced or pureed meat. Fruit products can be particularly advantageously made by the process of the present invention.

A problem with incipiently gelling alginate and low-methoxy pectate is that if they are subject to shear the structure of the resulting gel is adversely affected. An advantage of the invention is that it enables the rapid production of shaped products without serious impact from shearing. This is surprising given that the invention requires that the incipiently gelling liquid is guided into the cavities. Suitable means for guiding the liquid into the cavities are described below. They would be expected to subject the liquid to shear. It is surprising that the shear, which indeed occurs, does not lead to serious imperfections in the gelled products. This is particularly important in the production of food products based on gelled alginate and low-methoxy pectate where the negative impact from imperfections caused by shearing during production is correctly treated particularly seriously.

An advantage of the inventive process is that negligible scrap is produced. This is a particularly significant advantage when the shaped products are not capable of being tessellated i.e. cannot be fitted tightly together.

To achieve a process in which the shear is minimised the calcium ions which gel the alginate or low-methoxy pectate aqueous sol should preferably be uniformly distributed throughout the sol. In a preferred procedure there is first prepared a mixture of the alginate or low methoxy pectate sol and a calcium compound having insufficient free calcium ions to gel the alginate or low-methoxy pectate, and the mixture is rapidly mixed with fruit pulp or other material and an agent capable of releasing calcium ions from the calcium compound; the sol is gelled by the calcium ions thus liberated.

In a procedure alternative to that just described, the fruit material, with the source of calcium ions, is distributed throughout the alginate or low-methoxy pectate sol before the sol is mixed with the calcium-ion release agent.

In a further alternative procedure a suitable calcium compound is mixed with material to be added to the sol, for example, food material, and this mixture is then rapidly mixed with the alginate or low-methoxy pectate sol. Such a procedure is particularly useful in preparing non-acidic e.g. vegetable and meat products. For example, vegetable puree is mixed into an alginate sol and a slurry of a calcium compound such as calcium sulphate dihydrate is prepared; the vegetable puree containing alginate sol and the slurry of calcium sulphate are mixed rapidly together. Suitable calcium compounds are calcium salts which have low or slow solubility in water. In this alternative procedure the calcium ions are delivered not by the action of acid on an insoluble calcium salt but by the dissolution of the calcium salt e.g. the calcium sulphate.

In such procedures, an edible calcium-complexing agent or sequestrant such as tri-sodium citrate or sodium hexametaphosphate is preferably included in the mixture which is gelled. For example such an agent helps ensure a controlled release of calcium ions when the insoluble calcium compound and the acidic calcium-ion release agent are brought together.

The invention can also be used for preparing products in which the alginate or low-methoxy pectate gel only has a temporary function. An example is the preparation of heat-set pet foods based on meat protein. Alginate or low-methoxy pectate is used as a gelling agent to give structure to such products before they are set by heat-setting the protein. In this and other forms of the invention the sol and food material can be mixed with an aqueous mixture of a relatively insoluble calcium salt and a calcium sequestrant.

Preferred sources of calcium ions are calcium compounds which are substantially insoluble under neutral conditions but which become soluble under acid conditions, such as normal calcium citrate, $CaHPO_4$ and normal calcium tartrate. The agent used to release the calcium ions is then an acid, preferably a naturally occurring organic acid such as citric acid, malic acid, lactic acid, tartaric acid or fumaric acid. Compounds like glucono-delta-lactone which hydrolyse to form acids can also be used.

When the process is used to prepare simulated fruit products, the fruit pulp or puree used is obtained by any procedure which, while destroying the structure of the fruit as such, so as to release from the fruit the juice which it encloses, nevertheless stops well short of destroying all the structural elements of the fruit. The presence of such elements is desirable as they impart the appropriate fruit-simulating texture. Fruits which when cut into slices or chunks have a relatively uniform texture, such as apple, pear, peach and apricot can be imitated more closely than fruits such as raspberries and citrus fruits. To obtain products simulating fruits of the first kind, fruit purees can be used; whereas to obtain products simulating raspberries for example, it is best to employ the raspberry waste or pulp left when raspberries are lightly crushed to expel the greater part of the juice, leaving otherwise intact the cell sacs from which the juice has been expressed.

The proportion of fruit material used to form the simulated fruit can be varied within wide limits. A fruit puree is preferably used in an amount forming at least 25% by weight of the simulated fruit Material containing a high proportion of the solids of the fruit, such as the pulp remaining after pressing out of fruit juice, can be used at a somewhat lower level. When the lower levels of fruit material are used flavouring and colouring agents are preferably incorporated in the simulated fruit.

The sodium salt is a particularly convenient form of alginate or low-methoxy pectate from which to form a sol. The alginate or low-methoxy pectate used to form the products of the invention is preferably sodium alginate of high molecular weight (in excess of 100,000). Alginates having a low content of mannuronic acid residues (mannuronic: guluronic ratio less than 1:1) are specially suitable. The proportion of alginate or low-methoxy pectate used varies with its gelling ability (that is, the gel strength obtained per unit weight) and with the texture desired in the final product. We have found that when the preferred sodium alginate is used it suitably forms from 0.4% to 2% by weight of the simulated fruit to be formed.

As explained above it is generally recognised to be very important that, as far as possible, the mixture of alginate or low-methoxy pectate sol and other ingredients should be allowed to gel under the action of calcium ions while in a shear-free condition. This sets a task for the technologist in that alginate and low-methoxy pectate sols inevitably begin to gel when brought into contact with calcium ions. Thus it has long been appreciated that the mixing apparatus, dosing systems, pipes and indeed the whole process must be such that the incipiently gelling liquid has to be fed to moulds as rapidly as possible so that the structure built up in the gelling liquid is destroyed by shear to a minimum extent. So, mixing of the sol and the source of the calcium ions with the calcium-ion-release agent should be as rapid as possible. Similarly, gelling is preferably slowed e.g. by including in the system an edible calcium-complexing agent, such as tri-sodium citrate. By thus controlling the concentration of free calcium ions, it is just possible to allow some 2 minutes to elapse from the moment of first contact (i.e. in the mixer) between the alginate or low-methoxy pectate sol and the calcium-ion-release agent to the time at which the mixture reaches a substantially shear-free condition in the moulds in which gelation proceeds to completion. The preferred type of mixer is an in-line mixer having a low volume, a low residence time and a high shear rate and no back mixing. Guiding the incipiently gelling liquid into the moulds inevitably subjects the liquid to additional shear. It is a surprising feature of the present invention that this does not lead to serious deterioration of product quality.

It can be advantageous to use a freshly prepared mixture of alginate or low-methoxy pectate sol and the required calcium compound. A mixture that has been standing for an hour or more can gel much faster than a sol to which the calcium compound has been freshly added. It can also be advantageous to prepare the mixture continuously, so that it is of constant age when contacted with the calcium-ion-release agent. But batch processing is possible with use of sequestrants.

In forming the initial mixture of alginate or low-methoxy pectate sol and calcium compound, aeration is best avoided, so as to avoid formation of an end-product which is aerated. Suitable mixers are well-known. Also, too much gelation before the incipiently gelling liquid is guided into the cavities can cause air bubbles to become entrained which is deleterious for the products. In general it is necessary to control the gelling rate to ensure adequate liquidity when the liquid enters the cavities. This can conveniently be achieved by adjusting levels of citrate or other sequestrants in the formulation. However the penalty for being over cautious is that either the belt length has to be extended unduly or the belt speed and hence the line throughput has to be reduced, in order to provide adequate time for gelling in the cavities to allow satisfactory demoulding.

The incipiently gelling liquid is preferably fed onto the belt continuously through feeding means such as one or more nozzles or tubes. This provides a major advantage in that it avoids the need for shot dosing e.g. volumetric dosing which builds in discontinuity which is a problem with an incipiently gelling system. Such a change from a discontinuous to a continuous process also minimises time taken. A simple feed splitter can be used. It can also be advantageous for a single feeding means to scan across the belt. But, with suitable use of guiding means it can be particularly advantageous for there to be a plurality of such feeding means.

A wiper blade is a suitable means for guiding the liquid into the moulds. Such means can be made for instance of rubber, plastic or metal. The wiper blade can resemble a windscreen wiper. The guidance means are preferably provided as close as possible downstream of the deposit of the liquid onto the belt. V-shaped means are preferred. In a particularly preferred form of the invention the cavities in the belt are arrayed in horizontal columns and the apex of each V-shaped means is downstream of the centre line of each of the columns of cavities and, preferably, of each of a plurality of feeding means. The feeding means preferably feed the incipiently gelling liquid onto the belt within the V of the V-shaped means. The guiding means must be in contact with the surface of the belt.

The process is particularly applicable to awkwardly shaped products especially, as explained above, to products which cannot be tessellated. A particular type of such product are products which can only be formed in moulds with negative angles i.e. in moulds the mouth of which is smaller than the width of the product. For products which can only be made in moulds with negative angles it is advantageous for the belt to pass through a curve with a small radius. This helps de-mould the products. Mechanical pushrods can be used. Also it is advantageous in the production of such products for the belt to be made from a flexible material such as silicone rubber. This helps in demoulding. Silicone rubber also has the advantage that a belt made from it can easily be swept clean by a blade. However in general other materials can be used for the belt e.g. a suitable belt can be made from polyacetal. The guiding means have to catch all the incipiently gelling liquid fed onto the belt. Advantageously there should be a small upstand or side to the belt to prevent incipiently gelling liquid from flowing off the edge of the belt and, preferably, the guiding means abut the upstand or side.

The cavities are normally in the belt. The cavities can be made by forming holes which extend down towards the base of the belt. In a preferred embodiment the cavities extend through the belt and a layer of the same or another material runs along the back of the belt to complete the cavities. Such an arrangement is advantageous when demoulding the products especially with products which can only be made in moulds with negative angles when viewed from above. In another preferred option the cavities do not extend through the belt but are two-and-a-half dimensional e.g. do not have flat bases, for instance have rounded bases. Such cavities increase the range of shaped products which can be produced.

The cavities are preferably as closely packed together as is consistent with retaining sufficient structural strength in the belt.

The volumetric rate of feeding the liquid onto the belt should equal or, at least not be greater than the volumetric feed rate of cavities on the belt as they move past the depositing station. The time between initiating gelling of the alginate or low-methoxy sol, e.g. by release of calcium ions, to the liquid coming to rest in the cavities is preferably less than 30 seconds and particularly preferably less than 10 seconds. The time required for adequate gelling to permit the products to be demoulded depends on the particular ingredients and conditions but will normally be less than 10 minutes for ease of processing.

A suitable apparatus constructed in accordance with the invention and a suitable process in accordance with the invention will now be described in greater detail, by way of example only, with reference to the accompanying drawings.

EXAMPLE

A sol of sodium alginate was produced, containing a dispersion of anhydrous di-calcium phosphate, with the following composition (composition is given by weight of the final composition):

| Ingredient | % |
|---|---|
| Sodium Alginate | 0.85 |
| DCP (anhydrous)* | 0.30 |
| Sodium citrate | 0.20 |
| Sucrose | 10.00 |
| β-Carotene | 0.15 |
| Water | 38.50 |
| Total | 50.00 |

*Di-calcium phosphate: insoluble at pH >7.

A fruit mix, containing peach puree was produced with the following composition;

| Ingredient | % |
|---|---|
| Canned peach puree | 40.00 |
| Citric acid | 01.20 |
| Sodium citrate | 00.40 |
| Sucrose | 07.85 |
| Ascorbic acid | 00.30 |
| β-carotene | 00.15 |
| Potassium sorbate | 00.10 |
| Total | 50.00 |

Figure 1:
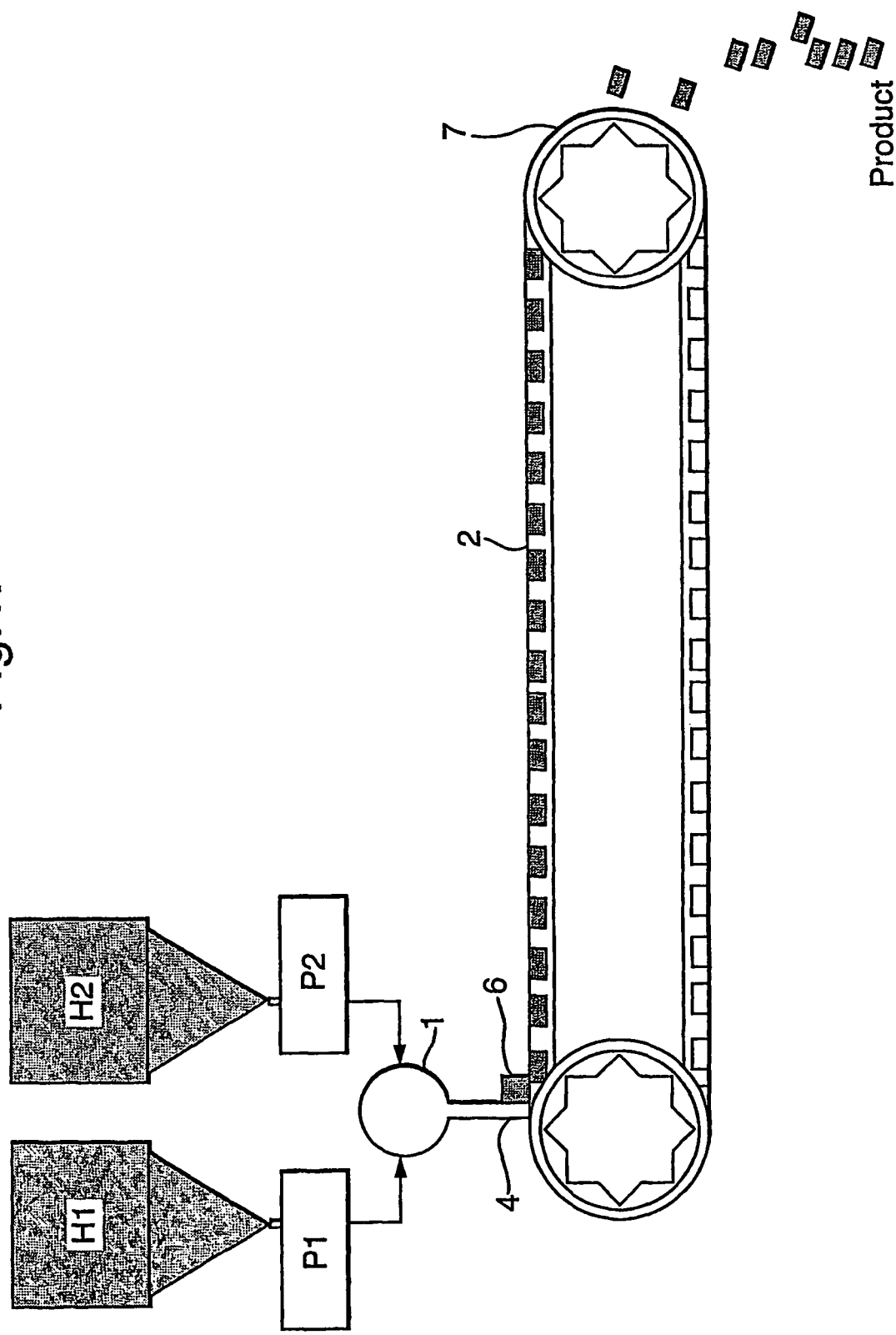
FIG. 1 shows a longitudinal section through a moulding apparatus according to the invention.
Figure 2:
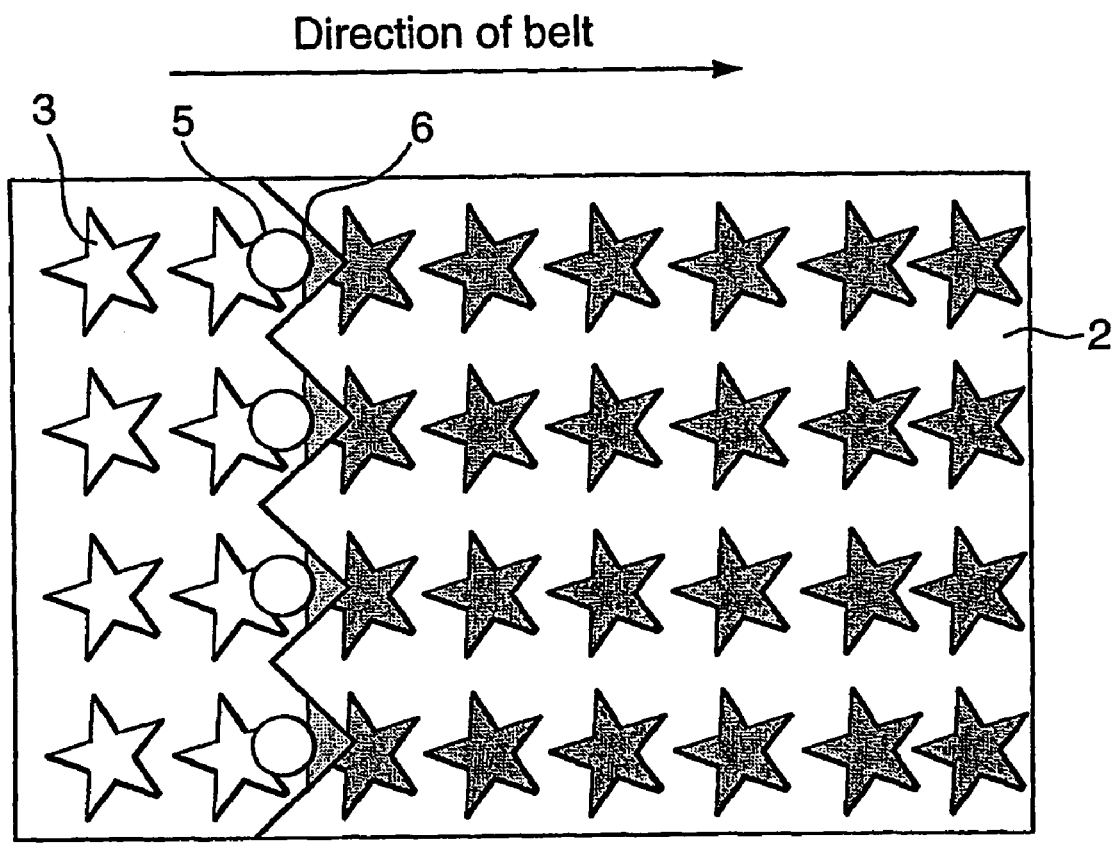
FIG. 2 is a plan view of the same apparatus.

The equipment used is shown in FIGS. 1 and 2, below.

The two mixes, held in feed hoppers H1 and H2 were metered via pumps P1 and P2 and blended in the in-line mixer 1, a mini-Mondo from Mondomix, in the ratio 1:1. (The mini-Mondo mixer from Mondomix is a baffled turbine mixer.) The belt 2, made of silicone rubber, had four parallel columns of star shaped cavities 3, each with a volume of 2.5 ml. Hence each row on the belt had a volume of 10 ml. The belt was moving at 88 rows per minute relative to the depositor and hence the required volumetric delivery from the depositor was 880 ml/min. The incipiently gelling liquid was fed at this rate onto the belt. The depositor was a four way flow splitter 4 with exits 5 aligned with the four columns of cavities acting as moulds. As shown in FIG. 2, each cavity 3 in each of the parallel columns is separated from each other in the direction of movement of the moving belt 2. V-shaped wiper blades 6 were positioned downstream of the depositor. Also as shown in FIG. 2, each wiper blade 6 is concave, for example, relative to the direction of movement of the moving belt 2. The V-shaped wiper blades formed a continuous unit. The V-shaped wiper blades 6 guided the incipiently gelling liquid into the moulds. They made close contact with the belt surface, thus ensuring that a negligible amount of the liquid escaped past the blade except that which was in the mould cavities. Thus the liquid was made to flow into the cavities and the surface of the belt was left virtually clean. The length of the belt between deposit and de-moulding 7 was 5 meters. The mix in the cavities gelled before de-moulding.

The apparatus described above is, of course, suitable for use with other compositions based on alginate or low-methoxy pectate aqueous sols.

The invention claimed is:

1. A process for preparing shaped products comprising feeding an incipiently gelling liquid based on alginate or low-methoxy pectate aqueous sol onto a moving belt containing cavities of a required shape so as to act as moulds, and guiding the liquid fed onto the belt into the cavities in which the liquid is allowed to gel, wherein at least some of the liquid is fed onto the belt outside the cavities and is subsequently guided into the cavities, the guiding being such as to subject the liquid to shear, and, thereafter, obtaining an individual shaped product from each of the cavities.

2. A process according to claim 1 in which the liquid is fed onto the belt at a rate not greater than the volumetric feed rate of the cavities.

3. A process according to claim 2 in which the rate is not more than 10% lower than the volumetric feed rate of the cavities.

4. A process according to claim 1 in which the incipiently gelling liquid comprises food material.

5. A process according to claim 2 in which a wiper blade is used for guiding the liquid into the cavities.

6. A process according to claim 5 in which V-shaped means are used for guiding the liquid into the cavities.

7. A process according to claim 6 in which the cavities are arrayed in horizontal columns and the apex of each V-shaped means is downstream of the centre line of each of the columns of cavities.

8. A process according to claim 7 in which the V-shaped means are aligned with feeding means through which the incipiently gelling liquid is fed onto the belt.

9. A process according to claim 1 in which the cavities are not tessellatable.

10. A process according to claim 9 in which the cavities are many sided.

11. A process according to claim 9 in which the cavities have negative angles and the belt is made of a sufficiently flexible material for products made in the cavities to be demoulded.

12. A process according to claim 1 in which a mixture of the alginate or low-methoxy pectate sol and a calcium compound having insufficient free calcium ions to gel the alginate or low-methoxy pectate is prepared and the mixture is then rapidly mixed with fruit pulp or other food material and an agent capable of releasing calcium ions from the calcium compound.

13. A process according to claim 12 in which the agent capable of releasing the calcium ions is an acid.

14. A process according to claim 12 in which a calcium-complexing agent is included.

15. The process of claim 1 wherein two of the cavities are separated from each other in the direction of movement of the belt.

16. A process for preparing shaped products comprising feeding an incipiently gelling liquid based on alginate or low-methoxy pectate onto a moving belt containing cavities of a required shape so as to act as moulds in which the liquid is allowed to gel and guiding the liquid fed onto the belt into the cavities using a concave wiper blade.

17. A process for preparing shaped products comprising the steps of:

feeding an incipiently gelling liquid based on alginate or low-methoxy pectate onto a moving belt containing cavities of a required shape so as to act as moulds arrayed in horizontal columns, and across which extends a guide means having a plurality of concave wiper blades in contact with the moving belt, each of the concave wiper blades being aligned with centreline of one of the columns; and using the plurality of concave wiper blades to guide substantially all of the liquid into the cavities in which the liquid is allowed to gel.

* * * * *